United States Patent [19]

Moore

[11] Patent Number: 5,308,373
[45] Date of Patent: May 3, 1994

[54] METAL AMMONIUM PHOSPHATE-ALKYLENE UREA BUFFERED FERTILIZER

[75] Inventor: William P. Moore, Hopewell, Va.

[73] Assignee: The Vigoro Corporation, Chicago, Ill.

[21] Appl. No.: 2,272

[22] Filed: Jan. 8, 1993

[51] Int. Cl.$^5$ .......................... C05C 9/00; C05C 9/02
[52] U.S. Cl. ............................................. 71/29; 71/30; 71/64.11
[58] Field of Search ............................ 71/11, 27, 28–30, 71/64.11

[56] References Cited

U.S. PATENT DOCUMENTS

| | | | |
|---|---|---|---|
| 4,378,238 | 3/1983 | Goertz | 71/3 |
| 5,019,148 | 5/1991 | Moore | 71/11 |

OTHER PUBLICATIONS

Bridger, Salutsky and Starostka, Metal Ammonium Phosphates as Fertilizers, Ind. Eng. Chem. Process Des. Dev. vol. 10, No. 3, May–Jun. 1962, pp. 181–188.
Peng, Ernst, Bridger, and Hartley, Slow Release Fertilizer Materials Based on Magnesium Ammonium Phosphate, Ind. Eng. Chem. Process Des. Dev, vol 18, No. 3, 1979, pp. 453–458.

*Primary Examiner*—Ferris Lander

[57] ABSTRACT

A method of preparing a new granular homogeneous metal ammonium phosphate-alkylene urea buffered fertilizer, containing slow releasing water insoluble nitrogen of two types which provide sustained nitrogen release. The method is based on the discovery that a strong metal ammonium phosphate matrix may be formed to homogeneously contain fine particles of alkylene urea compounds. The new buffered fertilizer provides concentrated slow release nitrogens, and phosphate, and buffering amounts of metal nutrients. The alkylene urea may be formed in-situ from liquids concommittantly with the formation of the metal ammonium phosphates, or it may be admixed as finely divided alkylene urea solids. The preferred alkylene ureas are methylene ureas and polymers, isobutylene diurea, and crotonylidene diurea. The metal nutrients are divalent and are preferably magnesium, manganese, zinc, and iron reacted as oxides, hydroxides, or carbonates. The ammonium ion is supplied in the method as anhydrous ammonia, ammonium hydroxide, and preferably as ammonium phosphate. The phosphate is supplied as phosphoric acids, ammonium phosphate, or preferably as a combination of phosphoric acid and ammonium phosphate. The method is most effectively carried out in a high intensity mixer-reactor, comprising a cylindrical pan rotating around a near-vertical center containing a smaller diameter mixer rotating at a high rate of speed relative to that of the pan. The magnesium, ammonium, and phosphorous entities are reacted at about a mol ratio of 1.0 to 1.0 to 1.0 at about the boiling point of water, and at about atmospheric pressure to form a new fertilizer composition containing between 14 and 30 percent nitrogen with between 40 and 80 percent of the nitrogen insoluble in cold water and buffered to a pH between 6.0 and 8.0.

19 Claims, No Drawings

METAL AMMONIUM PHOSPHATE-ALKYLENE UREA BUFFERED FERTILIZER

BACKGROUND OF THE INVENTION

1. Field of the Invention

This invention relates to controlled release fertilizers and methods for their preparation. More particularly, this invention relates to a new granular homogeneous metal ammonium phosphate-alkylene urea buffered fertilizer composition, containing slow releasing water insoluble nitrogen of two different types, which provides sustained release of nitrogen, phosphorous, and metal nutrients throughout long periods of time, and a method for its effective preparation. The new method and the composition obtained thereby are the results of the discovery that large portions of alkylene ureas may be homogeneously included in a matrix of metal ammonium phosphate to form hard granules with release characteristics improved over both components, and that the water insoluble alkylene urea compounds and polymers may be formed in-situ during the formation of the water insoluble metal ammonium phosphate matrix, from soluble materials.

2. Description of Related Art

Divalent metals form ammonium phosphates, having the general formula where Me represents the metals, $MeNH_4PO_4 \cdot XH_2O$, which are slightly soluble in water and soil solutions, and are non-burning sources of nitrogen, phosphorous and metals. These products which release slowly have been known to the art for a long time and magnesium ammonium phosphate has been effectively used as a speciality fertilizer where nitrogen concentrations were not matters of concern. The low concentrations of nitrogen in magnesium ammonium phosphate and in the other metal ammonium phosphates, have severly limited the practical utilities of these products to uses as sources of metal nutrients. The initial release of N is very low from these compounds.

Alkylene urea compounds and polymers have achieved wide commercial acceptance as nitrogen fertilizers and provide much of the controlled, and slow release, nitrogen currently used. Alkylene urea fertilizer compounds, isobutylene diurea, and crotonylidene diurea are used as slow release fertilizers, which depend upon low water solubilities and slow hydrolysis for their nitrogen releases, while ureaformaldehyde polymers depend upon some hydrolysis, but primarily upon microbial degradation for their nitrogen releases. The alkylene urea fertilizers are used as powders, or as granules, which have little resistance to crushing or attrition, and almost no buffer capacity to resist acidification, as the nitrogen is mineralized by soil microbes to nitrate.

Metal ammonium phosphates have been prepared from aqueous ammonia, phosphoric acid, and divalent metal oxides or hydroxides, or from ammonium phosphates and divalent metal oxides, or hydroxides.

Alkylene urea compounds and polymers are usually prepared by acid catalyzed reaction and or, polymerization of basic aqueous urea and alkyl aldehydes.

G. L. Bridger et al in Ind. Eng. Chem. Process Des. Dev. Vol 10, No. 3, 1962, pages 181–188, taught that divalent metals magnesium, iron, zinc, copper, and manganese form ammonium phosphates which are very slightly soluble and are effective, safe, and long lasting sources of nitrogen, phosphorous, and metals for plant foliar and soil nutrition.

P. H. Peng et al in Ind. Eng. Chem. Process Des. Dev. Vol 18, No. 3, 1979, pages 453–458, taught the continuous production of magnesium ammonium phosphate based fertilizers from dry magnesia, monoammonium phosphate and water, and optionally with potassium chloride and micronutrients added. The reaction was not complete throughout the granule. Ammonia losses were reported to be significant in the process. The granules produced in the conventional pan granulation method were noticeably wet, weak, and crumbled upon leaving the granulator and required several hours aging before they were strong enough for screening without breakage.

My U.S. Pat. No. 5,019,148 taught a stepwise method of preparing homogeneous mineral granules, such as the metal ammonium phosphates, by coreaction of acids and bases to form a chemically transient fluid adhesive which hardened to form a strong granule-binding cement. The transient fluid adhesive was comminuted by mechanical means to form plastic globules which were rolled to form spheroid granules.

H. M. Goertz in U.S. Pat. No. 4,378,238 taught preparation of low molecular weight urea formaldehyde compounds and polymers by the acid catalyzed reaction of aqueous urea and formaldehyde. This product contained methylene urea polymers and compounds of varying chain lengths with the majority consisting of short chain polymers of methylene diurea and dimethylene triurea, and is typical of a large part of the solid ureaformaldehyde products currently marketed in North America.

Alkylene urea compounds and low molecular weight polymers are normally supplied and used as powders or granules. The granules usually have little physical integrity and attrition frequently causes dusting and unreliable rates of nitrogen release.

The prior art has provided slow release alkylene urea fertilizers exhibiting high nitrogen concentrations and water insolubilities and rather low resistances to attrition. None of the prior art alkylene urea fertilizers provide buffering of the mineralized nitrogen.

The prior art also has provided slow release metal ammonium phosphate fertilizers as strong granular buffered nitrogen products, but the nitrogen concentrations are too low for effective use as commercial nitrogen fertilizers and the early nitrogen release is slower than needed for many nitrogen fertilizer uses.

Terms used in the plant nutrient industry and herein are defined as follows:

(1) water insoluble nitrogen=CWIN, defined in Official Methods of Analyses, 15th Edition, 1990, Association of Official Analytical Chemists, Vol 1, page 20, 945.01.
(2) mol ratios relating to metal ammonium phosphates=ratio of elements N, P, Metals.
(3) mol ratios relating to alkylene ureas=molar ratio of urea to aldehyde.
(4) moiety=functional chemical part, element, or functional group.

OBJECTS OF THE INVENTION

It is therefore a primary object of this invention to overcome the problems cited in the prior art by providing a new granular homogeneous metal ammonium phosphate-alkylene urea buffered fertilizer composition which provides sustained release of nitrogen, phosphorous, and metal nutrients in a buffered environment throughout long periods of time.

A further primary object of this invention is to provide a new and effective method for preparing the metal ammonium phosphate-alkylene urea fertilizer.

A further primary object of this invention is to provide a new and effective method for the in-situ formation of alkylene urea compounds and polymers within a metal ammonium phosphate matrix.

SUMMARY OF THE INVENTION

The present invention is directed to a new method of preparing buffered sustained release nitrogen fertilizer and to the new fertilizer composition prepared thereby. The new method comprises admixing ammonium, divalent metal, and alkylene urea moieties and coreacting with aqueous phosphate moieties to form a water insoluble matrix of metal ammonium phosphate containing the alkylene urea. The mol ratios of the ammonium, divalent metal, and phosphate moieties in the new method are, respectively, between 1.0 and 1.2 to between 1.0 and 1.2 and to between 1.0 and 1.2, and the water insoluble matrix amounts to between 30 and 80 percent of the final composition. The method requires that the reactants pass through a fluid stage under agitation before solidifying to water insoluble metal ammonium phosphate containing the alkylene urea. Effective operation of the method requires reaction temperatures between 50° and 150° C.

The new fertilizer comprises between 30 and 80 percent of a water insoluble matrix consisting of metal ammonium phosphate containing divalent metal, ammonium, and phosphate moieties in respective mol ratios of between 1.0 and 1.2, to between 1.0 and 1.2, and to between 1.0 and 1.2. The composition contains between 20 and 70 percent alkylene urea. The total nitrogen content of the new composition is between 14 and 30 percent of which between 40 and 80 percent is cold water insoluble. The pH of a 5 percent mixture of the composition in water is between 6 and 8.

DETAILED DESCRIPTION OF THE INVENTION

The method of this invention provides a new sustained releasing concentrated nitrogen fertilizer which exhibits buffering properties. The sustained release of the nitrogen, phosphorous, and metal nutrients from the solid fertilizer is produced by the overlapping sequential release of water soluble nitrogen as free urea, water soluble urea aldehyde compounds and polymers, water insoluble urea aldehyde polymers breaking down to water soluble nitrogen, and by the degradation of water insoluble metal ammonium phosphate to water soluble ammoniacal nitrogen. As the metal ammonium phosphate is degraded, metal oxides, hydroxides, or carbonates are produced and become available as plant nutrients and as buffers to react with acids produced by nitrogen mineralization and those acids present in the soil solution.

A method has been discovered which provides for the effective preparation of the new composition. To achieve this composition each aspect of the new method must be adhered to, although some variations in the individual aspects are possible, and sometimes necessary, to achieve optimum performance throughout the operating range of the method.

In the effective method for preparation of the instant fertilizer ammonium and divalent metal moieties, amounting to between 30 and 80 percent of the fertilizer, are admixed with comminuted alkylene urea, which amounts to between 20 and 70 percent of the fertilizer. The mixed ammonium and divalent metal moieties are then coreacted with one, or more, admixed aqueous phosphate moieties so that the mol ratios of the ammonium, divalent metal, and phosphate moieties are, respectively, between 1.0 and 1.2, to between 1.0 and 1.2, and to between 1.0 and 1.2, with the alkylene urea contained in the fluid coreacting mixture, and the pH is brought to between 6.0 and 8.0.

It is necessary to continue the coreaction and mixing at a temperature between 50° and 150° C. until solid water insoluble metal ammonium phosphate containing the alkylene urea is formed.

Water soluble ionic ammonium compounds provide ammonium moieties which are effective, and ammonium phosphates provide particularly effective ammonium sources for the instant method.

Divalent metal oxides are effective sources of the divalent metal moieties and are usually readily available and economical. Hydroxides, carbonates, and bicarbonates are also effective. The divalent metals most effective in the present invention are magnesium, manganese, zinc, iron, and copper.

Most phosphate sources used in agriculture are ionic in nature, are water soluble, and are generally useful in the present method. The most effective phosphate sources are phosphoric acid, polyphosphoric acid, monoammonium phosphate, diammonium phosphate, and ammonium polyphosphate. No particular purity is required in these ionic phosphates, which may be derived from electric furnace phosphoric acid, green phosphoric acid, black phosphoric acid, or other sources.

The comminuted alkylene urea admixed with, and contained in, the reactants forming the solid water insoluble matrix must be present in particles small enough for effective distribution throughout the forming metal ammonium phosphate, and are preferably comminuted to particles small enough that 90 percent will pass through a 40 U.S. Mesh screen.

Alkylene ureas preferred for use in the present method are methylene urea, isobutylene diurea, crotonylidene diurea, polymethylene urea, ureaformaldehyde polymer, and aminoureaformaldehyde polymer.

These alkylene ureas are normally prepared commercially by the reaction of urea and the appropriate aldehyde. For agricultural uses, an excess of urea is normally employed so that some free urea always remains in commercial products. It was found that commercially available alkylene urea products containing up to 50 percent of their total nitrogen from free urea could be used in the instant method. When free urea N amounted to more than 50 percent, the formation of solid metal ammonium phosphate was inhibited to the point that the resulting matrix fertilizer granules were not physically strong, and disintegrated rapidly in the presence of high moisture concentrations.

The reactions in the method are exothermic and the products therefrom are usually sufficiently dry and hard for normal screening and handling, but the metal ammonium phosphates normally contain enough water of hydration to limit concentrations of the nutrients. Nutrient concentrations are maximized by drying the solid water insoluble metal ammonium phosphate-alkylene urea products to a moisture content of between 0.5 and 5.0 percent. Although the drying virtually eliminates water of hydration, the metal ammonium phosphate matrices remained strong.

It is possible to carry out the present method in a single operation, wherein the admixing and coreacting steps are concommittantly carried out, so long as the basic parameters required for the effective performance are maintained. For clarity of understanding, and ease of operation, stepwise operation is preferred.

The instant method provides a unique sustained releasing fertilizer composition. The new composition contains between 30 and 80 percent water insoluble matrix consisting of metal ammonium phosphate, which is composed of divalent metal, ammonium, and phosphate moieties which have been reacted in respective mol ratios of between 1.0 and 1.2, to between 1.0 and 1.2, and to between 1.0 and 1.2. This matrix contains alkylene urea amounting to between 20 and 70 percent of the fertilizer. The total nitrogen content of the new fertilizer composition is between 14 and 30 percent, of which between 40 and 80 percent is cold water insoluble. When measured as a 5 percent water mixture, the pH is between 6 and 8, and provides buffering to acid in the soil.

The method of this invention may be used to produce sustained release fertilizers by including finely divided solid alkylene ureas in matrices of metal ammonium phosphate. Additionally, the method provides for the preparation of the urea aldehyde polymers from liquid ingredients at the same time that the solid metal ammonium phosphates matrix is being formed.

A particularly effective and economical use of the instant method is the concommittant preparation of magnesium ammonium phosphate and ureaformaldehyde polymer as a homogeneous sustained releasing matrix fertilizer from magnesium and ammonium moieties, in respective mol ratios of 1.0, to between 1.0 and 2.6, and to between 1.0 and 0.35, and from urea and formaldehyde in respective mol ratios of 1.0 to between 1.0 and 2.0. The nitrogen from the magnesium ammonium phosphate amounts to between 15 and 25 percent of the total nitrogen.

In the method, aqueous urea and formaldehyde, or urea and ureaformaldehyde concentrate, the ammonium moiety, ammonium phosphate, and a portion of the magnesium moiety, magnesium oxide are mixed. The portion of magnesium oxide mixed is limited to that required to eliminate any acidity from the homogeneous fluid mixture.

To the homogeneous fluid mixture a portion of the phosphate moiety is admixed as phosphoric acid. The portion of phosphate is the amount required to coreact with the magnesium, and ammonium moieties, and provide acid catalysis to polymerize the urea and formaldehyde and form therefrom water insoluble ureaformaldehyde polymers. The amount of the phosphate moiety required to be admixed and reacted as phosphoric acid amounts to between 15 and 60 percent, the amount depending somewhat on the other ingredients used in the method.

The remaining magnesium oxide is then admixed to coreact with, and neutralize, the mixture, and terminate the acid catalyzed polymerization of urea and formaldehyde, and to complete the solidification of a water insoluble magnesium ammonium phosphate matrix containing the ureaformaldehyde polymer homogeneously contained therein.

The method produces significant exothermic heat of reaction and it is necessary to maintain maximum temperatures during the coreaction and polymerization between 60° and 125° C. Temperatures below 60° C. do not allow effective completion of the magnesium ammonium phosphate reaction and the ureaformaldehyde polymerization in a practical period of time and leave excess water in the product. Temperatures above 125° C. produce high polymers of urea and formaldehyde which have incomplete or very slow nitrogen release properties.

In the preferred way of carrying out the method, the admixing, coreacting and acid catalyzed polymerization, neutralization, and solidification, are performed in an inclined pan enclosed to prevent loss of fumes, rotating around a center slightly inclined from vertical, usually 15 to 30 degrees, which carries its contents along its wall toward a scraper, which deflects the contents toward a high speed rotor, which applies thereto a strong shear force and homogenization. The strong shear forces are maintained to form solidified matrices in hard, attrition resistant fertilizer granules.

In the preparation of the magnesium ammonium phosphate-ureaformaldehyde polymer fertilizer, it is preferred to use the method wherein between 15 and 22 percent of the total nitrogen is derived from magnesium ammonium phosphate. When larger portions are used, total nitrogen concentrations are undesirably low, and when smaller portions are used, the granules are not optimumly hard and attrition resistant.

One of the preferred embodiments of the new fertilizer composition of this invention is a homogeneous, sustained releasing, fertilizer, comprising a matrix of solid water insoluble magnesium ammonium phosphate homogeneously containing ureaformaldehyde polymer. The composition has a total nitrogen content of between 10 and 30 percent of which between 25 and 80 percent is cold water insoluble, with between 15 and 25 percent of the total nitrogen derived from magnesium ammonium phosphate and the remainder from urea.

MODE OF OPERATION OF THE INVENTION

Having described the basic concepts of the instant invention, reference is now made to the following examples which are provided to illustrate the invention's method of preparing metal ammonium phosphate-alkylene urea fertilizer and the efficacious composition prepared thereby.

EXAMPLE 1

This example demonstrates the effectiveness of the method of this invention in converting diammonium phosphate, magnesium oxide, and phosphoric acid into a solidified matrix containing isobutylene diurea to form a granular sustained releasing metal ammonium phosphate-alkylene urea fertilizer. The operation was carried out batchwise in a pan granulator equipped with an agitator-mixer which operated throughout the performance of the method.

In the pan granulator was admixed the ammonium moiety diammonium phosphate, the divalent metal moiety magnesium oxide, and the comminuted alkylene urea, isobutylene diurea, all comminuted to pass through a 40 Mesh U.S. Screen, and coreacted with the admixed aqueous phosphate moiety, black phosphoric acid, in the amounts listed as follows:

| Admixed Materials | Wt, KG |
|---|---|
| Isobutylene diurea, 31-0-0 | 18.18 |
| Diammonium phosphate, 18-46-0 | 8.09 |
| Magnesium oxide, 57 Mg | 4.55 |

-continued

| Admixed Materials | Wt, KG |
|---|---|
| Water | 2.64 |
| Black phosphoric acid, 0-53-0 | 4.86 |
| Total | 38.32 |

In the reaction mixture, 20.6 percent of the total nitrogen was derived from the magnesium ammonium phosphate and the isobutylene diurea comprised 51 percent of the dry weight of the product. The respective mol ratios of ammonium, phosphate and magnesium, reacted were 1.00 to 0.85 to 1.03, and the pH was 7.0 after mixing and reacting. The coreaction was carried out with temperatures reaching a maximum of 112° C., and with continued agitation until solid water insoluble magnesium ammonium phosphate was formed, completely containing the isobutylene diurea.

The product granules were withdrawn from the pan granulator, dried in a fluid bed dryer, and analyzed with the results recorded as follows:

| Component | Wt % |
|---|---|
| Nitrogen, total, | 19.9 |
| water insoluble (CWIN) | 15.3 |
| Phosphate, $P_2O_5$ total, | 17.7 |
| $P_2O_5$ citrate soluble | 13.1 |
| Magnesium, total | 7.2 |
| water soluble | 1.3 |
| EDTA soluble | 5.8 |
| Water | 4.9 |

The analyses of the granules indicated that 77.1 percent of the nitrogen was converted to CWIN, and 74.0 percent of the phosphate was citrate soluble. The magnesium was 81.0 percent soluble in EDTA and only 18.2 percent water soluble.

EXAMPLE 2

This example demonstrates the buffering effect of the metal ammonium phosphate-alkylene urea fertilizer of this invention.

The pH of a 100 ml sample of soil leachate from an acid soil sample was measured to be 3.1. A 10 gram sample of the product from Example 1 was mixed thoroughly with the water and the pH was buffered to 5.1.

EXAMPLE 3

This example demonstrates a preferred embodiment of the instant invention for the concommittant preparation of magnesium ammonium phosphate and ureaformaldehyde polymer as a homogeneous sustained releasing matrix fertilizer.

The device in which the method was performed consisted of an inclined vertical rotary steel pan 0.72 meters in diameter, 0.38 meters deep, with the pan rotating at an angle of 30° from vertical. The pan was equipped with a stationary wall scraper-deflector which deflected the contents of the pan toward a high speed rotor 0.35 meters in diameter located 6 centimeters from the bottom of the pan so that its tips pass 3 centimeters from the wall of the pan. The rotor consisted of a 7.5 centimeter diameter shaft with 7 steel bars 2 centimeters thick and 5 centimeters wide, protruding radially equi-spaced therefrom starting at the bottom of the shaft with each additional bar located 3 centimeters above the next lower bar.

Ureaformaldehyde concentrate, urea, diammonium phosphate and sufficient magnesium oxide were mixed in the device to bring the pH to 8.2. The phosphoric acid was then added with continued mixing and reaction, and finally the remaining magnesium oxide was added with continuing high shear mixing to provide the amounts of reactants shown as follows:

| Reactants | Wt, KG |
|---|---|
| UFC-85 | 5.14 |
| DAP (−40 mesh), 18-46-0 | 7.91 |
| Urea, 46-0-0 | 9.86 |
| Magnesium oxide, 57 Mg | 4.32 |
| Phosphoric acid, black, 0-53-0 | 6.86 |
| Total | 34.09 |

The mixing and reaction under base conditions were continued for 4 minutes, and after acid addition, 10 minutes. The respective mol ratios of the ammonium, phosphate, and magnesium were 1.0 to 1.07 to 1.0 and the percent of the total nitrogen derived from magnesium ammonium phosphate was 21.7 percent. The maximum temperature occurred during the acid reaction and amounted to 103° C. The reaction was continued with high shear agitation until solid water insoluble magnesium ammonium phosphate was formed, completely containing the ureaformaldehyde polymer, which was formed by polymerization reaction of the liquid ureaformaldehyde concentrate and urea during the acid portion of the coreaction.

The product was screened, without further drying, without appreciable fines formation, and was analyzed to give the results listed as follows:

| Component | Wt % |
|---|---|
| Nitrogen, total, | 20.55 |
| water insoluble (CWIN) | 12.55 |
| Phosphate, $P_2O_5$ total, | 26.10 |
| $P_2O_5$ citrate soluble | 19.20 |
| Magnesium, total | 7.85 |
| water soluble | 1.20 |
| EDTA soluble | 5.50 |
| Water | 6.60 |

The analysis of the product granules indicated that 61 percent of the nitrogen was converted to CWIN and that 74 percent of the phosphate was citrate soluble. The magnesium was 70 percent soluble in EDTA and 15 percent soluble in water.

The granules were very resistant to attrition and crushing. The average force required to crush a 6–8 mesh granule on a flat steel plate was 3.1 Kg.

EXAMPLE 4

This example demonstrates the effectiveness of the present method in converting a variety of divalent metals to metal ammonium phosphate-alkylene urea fertilizers, by using zinc oxide as a starting ingredient. The same apparatus was used as in Example 3.

To the admixing, coreacting device was added the reactants listed as follows:

| Reactants | Wt, Kg |
|---|---|
| Zinc Oxide, 72 Zn | 9.46 |
| Diammonium Phosphate, −40 mesh, 18-46-0 | 7.82 |
| Phosphoric Acid, white, 0-61-0 | 5.46 |
| Methylene diurea, | 16.30 |

-continued

| Reactants | Wt, Kg |
|---|---|
| commercial, 41-0-0 | |
| Total | 39.04 |

The respective mol ratios of ammonium, phosphate, and zinc were 1.0 to 0.98 to 1.03 and the percent of the total nitrogen derived from zinc ammonium phosphate was 17.4. The zinc ammonium phosphate amounted to 59.4 percent of the matrix fertilizer granules.

The product was screened and analyzed to give the results listed as follows:

| Component | Wt % |
|---|---|
| Nitrogen, total, | 20.2 |
| water insoluble (CWIN) | 11.2 |
| Phosphate, $P_2O_5$ total, | 17.3 |
| $P_2O_5$ citrate soluble | 10.8 |
| Zinc, total | 16.9 |
| water soluble | 0.15 |
| EDTA soluble | 6.47 |
| Water | 5.2 |

The analyses indicated that 55 percent of the nitrogen was converted to CWIN and that 62.6 percent of the phosphate was citrate soluble. Only 0.9 percent of the zinc was water soluble, but 38.3 percent was soluble in EDTA.

The granules were resistant to attrition and crushing and the average force required to crush a 6-8 mesh granule was 2.7 Kg.

EXAMPLE 5

This example demonstrates the preferred embodiment of the new homogeneous fertilizer prepared by the instant method consisting of a matrix of solid water insoluble magnesium ammonium phosphate completely containing ureaformaldehyde polymer. Analysis of the granular fertilizer is listed as follows:

| Component | Wt % |
|---|---|
| Nitrogen, total, | 21.6 |
| CWIN | 13.2 |
| Phosphate, total, | 27.5 |
| citrate soluble | 20.2 |
| Magnesium, total | 8.3 |
| water soluble | 1.2 |
| EDTA soluble | 5.8 |

The nitrogen derived from magnesium ammonium phosphate amounted to 21.7 percent of the total nitrogen. The granules were semispheroids and the average 6-8 mesh granules required 4.2 kilograms to crush between a 1" dia. steel piston and a flat steel plate. Microscopic inspection of a cross-sectioned granule indicated the granules to be physically homogeneous.

EXAMPLE 6

This example demonstrates the superior sustained releasing properties of the nitrogen under practical conditions of the preferred embodiment fertilizer of Example 5. The product of Example 5, and several commercial fertilizers, including slow release nitrogen products for comparison, were mixed in pots, containing 50 percent sand and 50 percent by volume pine bark, at a rate of 14 pounds of nitrogen per 1000 square feet. The pots were kept watered to maintain typical nursery growing conditions, and then drenched one time each 7 days with a volume of distilled water amounting to two times the volume of soil in the pot for the first two weeks, and thereafter drenching and leaching less frequently. Nitrogen content of the water was determined on each leachate from each pot. The tests were run with four replicates of each pot. The results showing the average nitrogen concentration in the leachates for the Example 5 product and the other products are tabulated as follows:

| FERTILIZER TIME IN SOIL, WEEKS | TOTAL NITROGEN IN LEACHATE, ppm FROM | | | |
|---|---|---|---|---|
| | EXAMPLE 5 | UREA | COMMERCIAL 41-0-0 METHYLENE UREA | COMMERCIAL 38-0-0 NITROFORM |
| 1 | 151 | 274 | 201 | 50 |
| 2 | 68 | 96 | 115 | 46 |
| 4 | 48 | 34 | 48 | 40 |
| 6 | 53 | 16 | 31 | 18 |
| 8 | 20 | 3 | 12 | 13 |
| 11 | 26 | 0 | 8 | 14 |
| 15 | 17 | 0 | 6 | 10 |
| 20 | 36 | 0 | 3 | 7 |
| 26 | 28 | 0 | 0 | 5 |

The product of Example 5 gave a strong nitrogen release initially from contained water soluble nitrogen and then continued to release nitrogen as the various alkyl ureas and magnesium ammonium phosphate degraded with time, while the competitive products did not evenly sustain the release of nitrogen.

I claim:

1. A method of preparing a sustained releasing concentrated fertilizer exhibiting buffering properties, the method comprising;
    (a) admixing ammonium and divalent metal moieties with comminuted alkylene urea amounting to between 20 and 70 percent of the fertilizer;
    (b) coreacting the admixed ammonium and divalent metal moieties mixed with the alkylene urea with one or more admixed aqueous phosphate moieties, in respective mol ratios of between 1.0 and 1.2 to between 1.0 and 1.2 and to between 1.0 and 1.2, so that the alkylene urea is contained in the coreacting mixture at a pH between 6.0 and 8.0;
    (c) coreacting the admixed moieties at a temperature between 50° and 150° C. with continued mixing until water insoluble metal ammonium phosphate containing the alkylene urea is formed as a solid slow releasing fertilizer containing between 14 and 30 percent total nitrogen of which between 40 and 80 percent is insoluble in cold water.

2. The method of claim 1 wherein the ammonium moieties are water soluble ionic ammonium compounds.

3. The method of claim 1 wherein the ammonium moieties are ammonium phosphates.

4. The method of claim 1 wherein the divalent metal moieties are divalent metal oxides.

5. The method of claim 1 wherein the divalent metal moieties are divalent metal compounds selected from the group consisting of hydroxides, carbonates, bicarbonates.

6. The method of claim 1 wherein the divalent metal moieties consist of one, or more, divalent metals selected from the group consisting of magnesium, manganese, zinc, iron, and copper.

7. The method of claim 1 wherein the aqueous phosphate moieties are water soluble ionic phosphate compounds.

8. The method of claim 1 wherein the aqueous phosphate moieties are water soluble phosphate compounds selected from the group consisting of phosphoric acid, polyphosphoric acid, monoammonium phosphate, diammonium phosphate, and ammonium polyphosphate.

9. The method of claim 1 wherein the alkylene urea is comminuted so that 90 percent will pass through a 40 U.S. Mesh screen.

10. The method of claim 1 wherein the alkylene urea is selected from the group consisting of methylene urea, isobutylene diurea, crotonylidene diurea, polymethylene urea, ureaformaldehyde polymer, and aminoureaformaldehyde polymer.

11. The method of claim 1 wherein the alkylene urea contains free urea nitrogen amounting to between 0 and 50 percent of its total nitrogen.

12. The method of claim 1 wherein the solid water insoluble metal ammonium phosphate-alkylene urea is dried to a moisture content between 0.5 and 5.0 percent.

13. The method of claim 1 wherein the admixing and coreacting are both performed in a single operation.

14. A new concentrated solid sustained releasing fertilizer composition prepared by the method of claim 1, comprising between 30 and 80 percent water insoluble matrix consisting of metal ammonium phosphate composed of divalent metal, ammonium, and phosphate moieties reacted in respective mol ratios of between 1.0 and 1.2, to between 1.0 and 1.2, and to between 1.0 and 1.2, and containing between 20 and 70 percent alkylene urea, with a total nitrogen content of between 14 and 30 percent, of which between 40 and 80 percent is cold water insoluble, the composition exhibiting a pH between 6 and 8 in a 5 percent water mixture.

15. A method of concommittant preparation of magnesium ammonium phosphate and ureaformaldehyde polymer as a homogeneous sustained releasing matrix fertilizer from magnesium, ammonium, and phosphate moieties in respective mol ratios of 1.0 to between 1.0 and 2.6, and to between 1.0 and 0.35, and from urea and formaldehyde, in respective mol ratios of between 1.0 and 2.0 to 1.0, the nitrogen from magnesium ammonium phosphate amounting to between 15 and 25 percent of the total nitrogen, the method comprising;

(a) admixing the aqueous urea and formaldehyde, the ammonium moiety, a portion of the phosphate moiety as ammonium phosphate, and a portion of the magnesium moiety, magnesium oxide, sufficient to form a homogeneous fluid free of acidity;

(b) admixing therewith the portion of the phosphate moiety, as phosphoric acid, required to coreact with the magnesium and ammonium moieties and provide acid catalysis to polymerize the urea and formaldehyde to water insoluble ureaformaldehyde polymers, the portion of the phosphate admixed as phosphoric acid amounting to between 15 and 60 percent;

(c) admixing therewith, the remaining magnesium oxide to coreact with and neutralize the mixture, terminate the acid catalyzed polymerization of urea and formaldehyde, and to complete solidification of a water insoluble magnesium ammonium phosphate matrix containing the ureaformaldehyde polymer homogeneously dispersed therein.

16. The method of claim 15 wherein maximum temperature during the coreactions and polymerizations is maintained between 60° and 125° C.

17. The method of claim 15 wherein the admixing, coreacting, acid catalyzed polymerization, neutralization, and solidification are performed in an enclosed inclined pan, rotating around a center slightly inclined from vertical, which carries its contents toward a scraper, which deflects the contents toward a high speed rotor, which applies thereto a strong shear force and homogenization to the contents, with solidification occurring while the strong shear force is maintained to form solidified matrices as hard, attrition resistant fertilizer granules.

18. The method of claim 15 wherein the percent of total nitrogen derived from magnesium ammonium phosphate is between 15 and 22.

19. A new homogeneous sustained releasing matrix fertilizer prepared by the method of claim 15, comprising; a matrix of solid water insoluble magnesium ammonium phosphate homogeneously containing ureaformaldehyde polymer with a total nitrogen content of between 10 and 30 percent, of which between 25 and 80 percent is cold water insoluble, with between 15 and 25 percent of the total nitrogen derived from magnesium ammonium phosphate and the remainder from urea.

* * * * *